(12) United States Patent
Lee et al.

(10) Patent No.: US 8,579,321 B2
(45) Date of Patent: Nov. 12, 2013

(54) ROOF AIRBAG APPARATUS OF VEHICLE

(75) Inventors: Chang Hyun Lee, Yongin-si (KR); Jun Yeol Choi, Seoul (KR); Un Koo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 20 days.

(21) Appl. No.: 13/323,586

(22) Filed: Dec. 12, 2011

(65) Prior Publication Data

US 2013/0087995 A1    Apr. 11, 2013

(30) Foreign Application Priority Data

Oct. 5, 2011   (KR) ........................ 10-2011-0100993

(51) Int. Cl.
*B60R 21/214*    (2011.01)
*B60R 21/233*    (2006.01)

(52) U.S. Cl.
USPC ....................................... 280/729; 280/730.1

(58) Field of Classification Search
CPC .. B60R 21/214; B60R 21/231; B60R 21/233; B60R 2021/0004; B60R 2021/0018; B60R 2021/0048; B60R 2021/0058; B60R 2021/23192; B60R 2021/233; B60R 2021/23308; B60R 2021/23316; B60R 2021/23324; B60R 2021/23332
USPC .................................... 280/729, 730.1, 743.1
See application file for complete search history.

(56) References Cited

U.S. PATENT DOCUMENTS

| | | | | |
|---|---|---|---|---|
| 3,606,377 A * | 9/1971 | Martin | .......................... | 280/741 |
| 5,470,103 A * | 11/1995 | Vaillancourt et al. | ...... | 280/730.1 |
| 6,419,262 B1 * | 7/2002 | Fendt et al. | ................... | 280/729 |
| 7,625,008 B2 * | 12/2009 | Pang et al. | ................. | 280/743.1 |
| 7,673,901 B2 * | 3/2010 | Hanawa et al. | ............ | 280/743.1 |
| 7,918,480 B2 * | 4/2011 | Kwon et al. | ............... | 280/728.2 |
| 7,926,840 B1 * | 4/2011 | Choi | .......................... | 280/730.1 |
| 8,215,665 B2 * | 7/2012 | Ohara et al. | ................... | 280/729 |
| 2005/0073135 A1 * | 4/2005 | Choi | .......................... | 280/730.1 |
| 2005/0104339 A1 * | 5/2005 | Hasebe et al. | ................ | 280/729 |
| 2005/0184489 A1 * | 8/2005 | Kobayashi | ..................... | 280/729 |
| 2007/0262572 A1 * | 11/2007 | Fischer et al. | ............. | 280/730.1 |
| 2010/0090447 A1 * | 4/2010 | Deng et al. | ................. | 280/730.1 |
| 2011/0018240 A1 * | 1/2011 | Marable et al. | ............ | 280/728.3 |
| 2012/0049492 A1 * | 3/2012 | Choi et al. | ................. | 280/730.1 |

FOREIGN PATENT DOCUMENTS

KR    10-2010-0120400 A    11/2010

* cited by examiner

*Primary Examiner* — Joseph Rocca
(74) *Attorney, Agent, or Firm* — Morgan, Lewis & Bockius LLP

(57) ABSTRACT

A relatively small capacity of airbag apparatus can be used by relatively shortening the distance between locations on which a passenger and the airbag apparatus are mounted to more effectively prevent a head and a neck of the passenger from being damaged through a discriminated supporting action of an upper body and a head part of the passenger while reducing a weight and a price of the airbag apparatus and the airbag apparatus can be easily standardized by configuration the airbag apparatus regardless of the shapes of a crash pad and a wind shield glass.

5 Claims, 12 Drawing Sheets

US 8,579,321 B2

ROOF AIRBAG APPARATUS OF VEHICLE

CROSS-REFERENCE TO RELATED APPLICATION

This application claims under 35 U.S.C. §119(a) the benefit of Korean Patent Application No. 10-2011-0100993 filed Oct. 5, 2011, the entire contents of which application is incorporated herein for all purposes by this reference.

BACKGROUND OF INVENTION

1. Field of Invention

The present invention relates to a roof airbag apparatus of a vehicle, and more particularly, to an airbag technology that is installed in a roof of a passenger-side roof of a vehicle to protect passengers when the vehicle crashes.

2. Description of Related Art

In a passenger-side airbag apparatus in the related art, as shown in FIG. 1, an airbag cushion 502 is incorporated in a crash pad 500 and thereafter, the airbag cushion 502 is inflated to the outside of the crash pad 500 when a vehicle crashes to protect passengers and when the airbag cushion 502 is inflated, the airbag cushion 502 is extended while being guided by top parts of a wind shield glass 504 and a crash pad 500.

In the passenger-side airbag apparatus in the related art, since locations in which the passenger and the airbag apparatus are incorporated are relatively distant from each other, a large capacity of airbag apparatus is required. Therefore, the airbag apparatus has a large weight and a relatively high price and designs of the crash pads 500 and the wind shield glass 504 are different for each vehicle, and as a result, the shape and structure of the airbag cushion 502 should be changed. Accordingly, it is difficult to standardize the airbag apparatus.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a roof airbag apparatus of a vehicle that allows a relatively small capacity of airbag apparatus to be used by relatively shortening the distance between locations on which a passenger and the airbag apparatus are mounted to more effectively prevent a head and a neck of the passenger from being damaged through a discriminated supporting action of an upper body and a head part of the passenger while reducing a weight and a price of the airbag apparatus and allows the airbag apparatus to be easily standardized by being configured regardless of the shapes of a crash pad and a wind shield glass.

In one aspect, the present invention provides a roof airbag apparatus of a vehicle, including a housing mounted on a roof of the vehicle, an outer cushion that is incorporated in the housing and inflated toward the front of a shoulder of a passenger downward, an inner cushion that is incorporated in the housing, inflated toward the front of a head of the passenger downward, and positioned inside the outer cushion, and an inflator configured to supply inflation gas to be supplied to the outer cushion and the inner cushion.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain embodiments thereof illustrated the accompanying drawings which are given hereinbelow by way of illustration only, and thus are not limitative of the present invention, and wherein.

Figure 1:
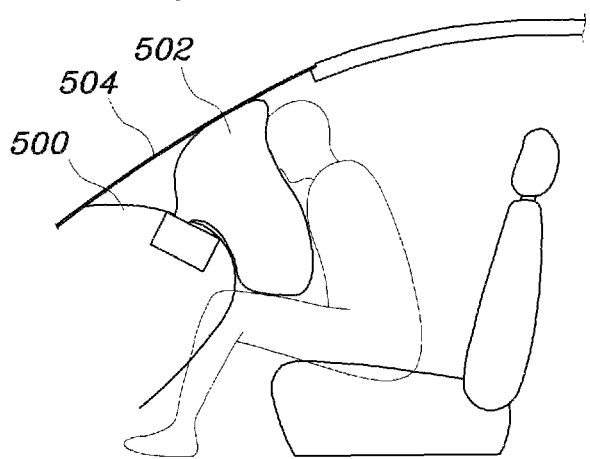
FIG. 1 is a diagram describing a passenger-side airbag apparatus in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 2:
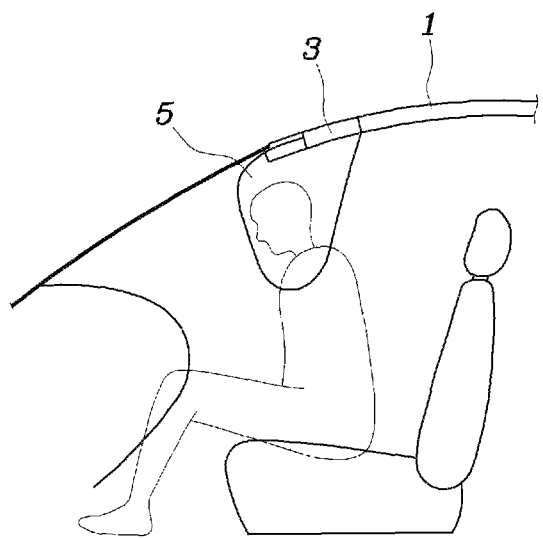
FIG. 2 is a conceptual diagram describing a concept of an exemplary roof airbag apparatus according to the present invention.

Referring to FIG. 2, in a roof airbag apparatus of a vehicle according to various embodiments of the present invention, a housing 3 is mounted on a roof 1 of the vehicle, an airbag cushion 5 is extended downward from the housing 3 to absorb an impact while appropriately constraining an upper body and a head part of a passenger when the airbag cushion 5 is inflated.

Various embodiments of the present invention for the action may includes an outer cushion 7 that is incorporated in the housing 3 and inflated toward the front of a shoulder of a passenger downward, an inner cushion 9 that is incorporated in the housing 3, inflated toward the front of a head of the passenger downward, and positioned inside the outer cushion 7, and an inflator 11 configured to supply inflation gas to be supplied to the outer cushion 7 and the inner cushion 9, as shown in FIGS. 3 to 7.

Figure 3:
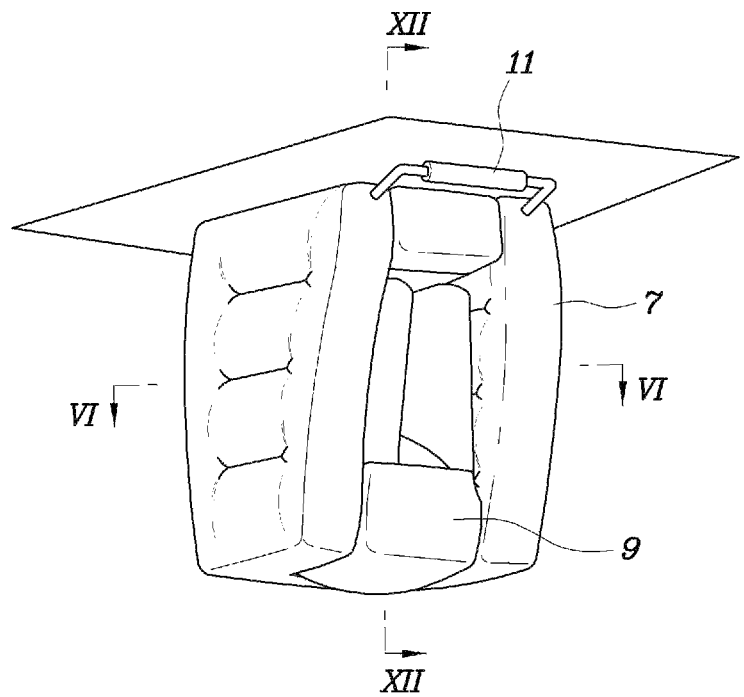
FIG. 3 is a diagram showing an exemplary roof airbag apparatus according to the present invention.

That is, in various embodiments, the airbag cushion 5 is constituted by the outer cushion 7 and the inner cushion 9, such that when the airbag cushion 5 is inflated in a shape shown in FIG. 3 to selectively buffer and support a shoulder part, and head and neck parts of the passenger.

While the outer cushion 7 is inflated, a U-shaped cross section of the outer cushion opened toward a rear passenger from the front is extended vertically, the outer cushion is connected to receive inflation gas from the inflator 11, and the outer cushion 7 includes a supply vent hole 13 transferring the inflation gas to the inner cushion 9.

The inner cushion 9 which is coupled to an inner part of the outer cushion which is opened in a U shape includes a receiving vent hole 15 for receiving the inflation gas from the outer cushion 7 and a discharging vent hole 17 for discharging the inflation gas to the outside.

Figure 4:
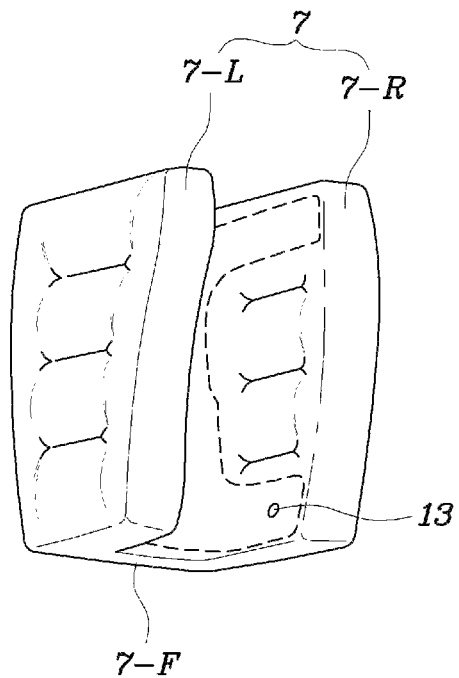
FIG. 4 is a diagram showing an outer cushion of FIG. 3.
Figure 5:
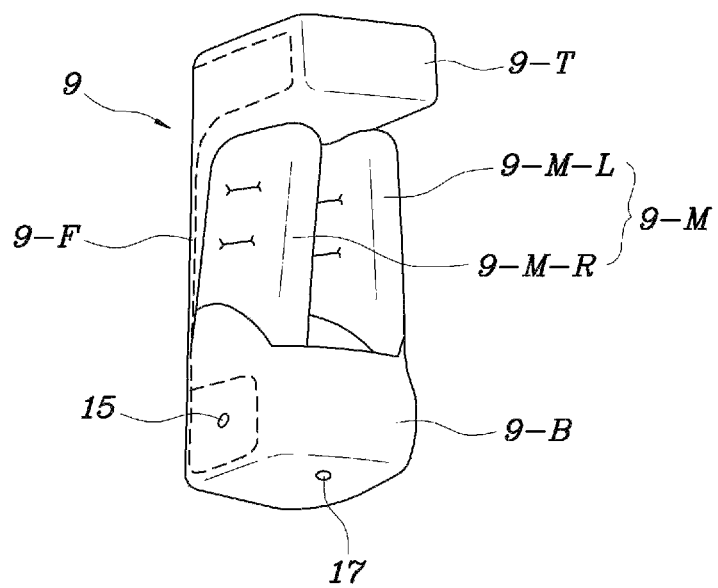
FIG. 5 is a diagram showing an inner cushion of FIG. 3.
Figure 6:
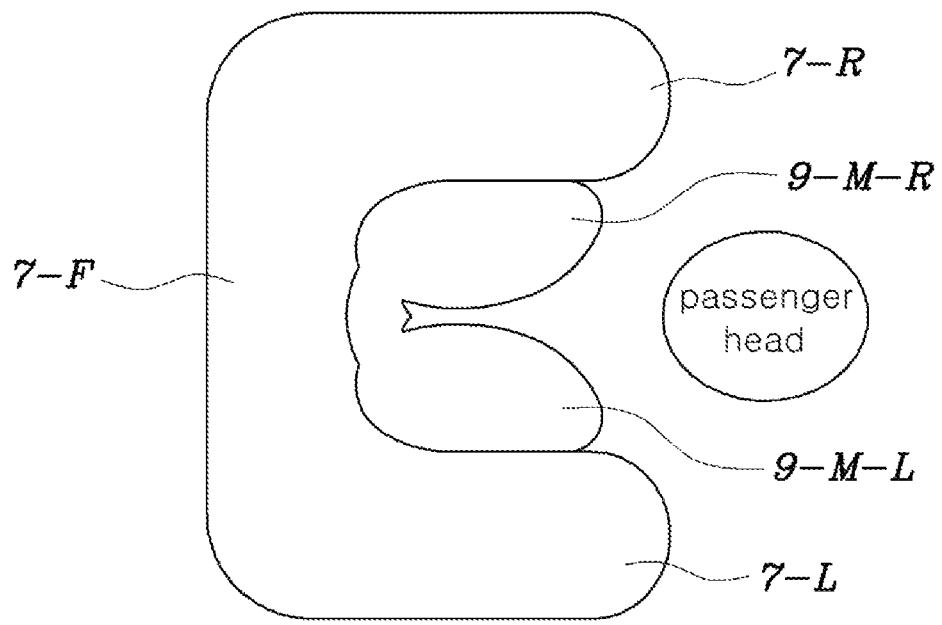
FIG. 6 is a cross-sectional view taken along line VI-VI of FIG. 3.

For reference, dotted lines of FIGS. 4 and 5 represent a portion where the outer cushion 7 and the inner cushion 9 are sewed and joined with each other.

The outer cushion 7 includes a left wing part 7-L forming an opened left piece of the U-shaped cross section, a right wing part 7-R forming a right piece, and an outer front part 7-F connecting front sides of the left wing part 7-L and the right wing part 7-R with each other, such that the left wing part 7-L and the right wing part 7-R support the shoulder part of the passenger to move forward.

The inner cushion 9 includes an inner top part 9-T connecting top parts of the left wing part 7-L and the right wing part 7-R horizontally, an inner bottom part 9-B connecting bottom parts of the left wing part 7-L and the right wing part 7-R horizontally, an inner front part 9-F connecting the inner top part 9-T and the inner bottom part 9-B vertically while being adjacent to the outer front part 7-F, and an inner middle part 9-M protruding toward the inner top part 9-T from the inner bottom part 9-B at the rear side of the inner front part 9-F, such that the inner middle part 9-M supports the head part of the passenger to move forward.

The inner middle part 9-M of the inner cushion 9 is divided into a left inner middle part 9-M-L adjacent to the left wing part 7-L of the outer cushion 7 and a right inner middle part 9-M-R adjacent to the right wing part 7-R.

Figure 7:
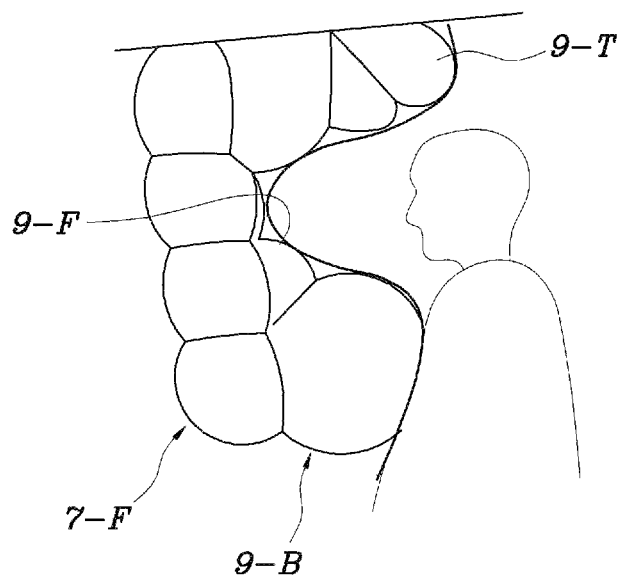
FIG. 7 is a cross-sectional view taken along line VII-VII of FIG. 3.

The inner front part 9-F of the inner cushion 9 has a structure of forming an S-shaped curved part which is depressed to be concave toward the front together with the inner top part 9-T and the inner bottom part 9-B. Dotted lines of FIG. 7 represent an outline of the S-shaped curved part.

The supply vent hole 13 is formed on inner lower surfaces of the left wing part 7-L and the right wing part 7-R of the outer cushion 7, the receiving vent hole 15 are formed at positions corresponding to the supply vent holes 13 of both sides of the inner bottom part 9-B of the inner cushion 9, and the discharging vent hole 17 is formed on a lower surface of the inner bottom part 9-B.

The inflator 11 is connected to supply inflation gas supplied form one inflator 11 to each of the top parts of the left wing part 7-L and the right wing part 7-R of the outer cushion 7.

As the airbag apparatus operates, the inflation gas generated from the inflator 11 is first supplied to the outer cushion 7, supplied to the inner cushion 9 from the outer cushion 7 through the supply vent hole 13 and the receiving vent hole 15, and discharged to the outside through the discharging vent hole 17.

Figure 23:
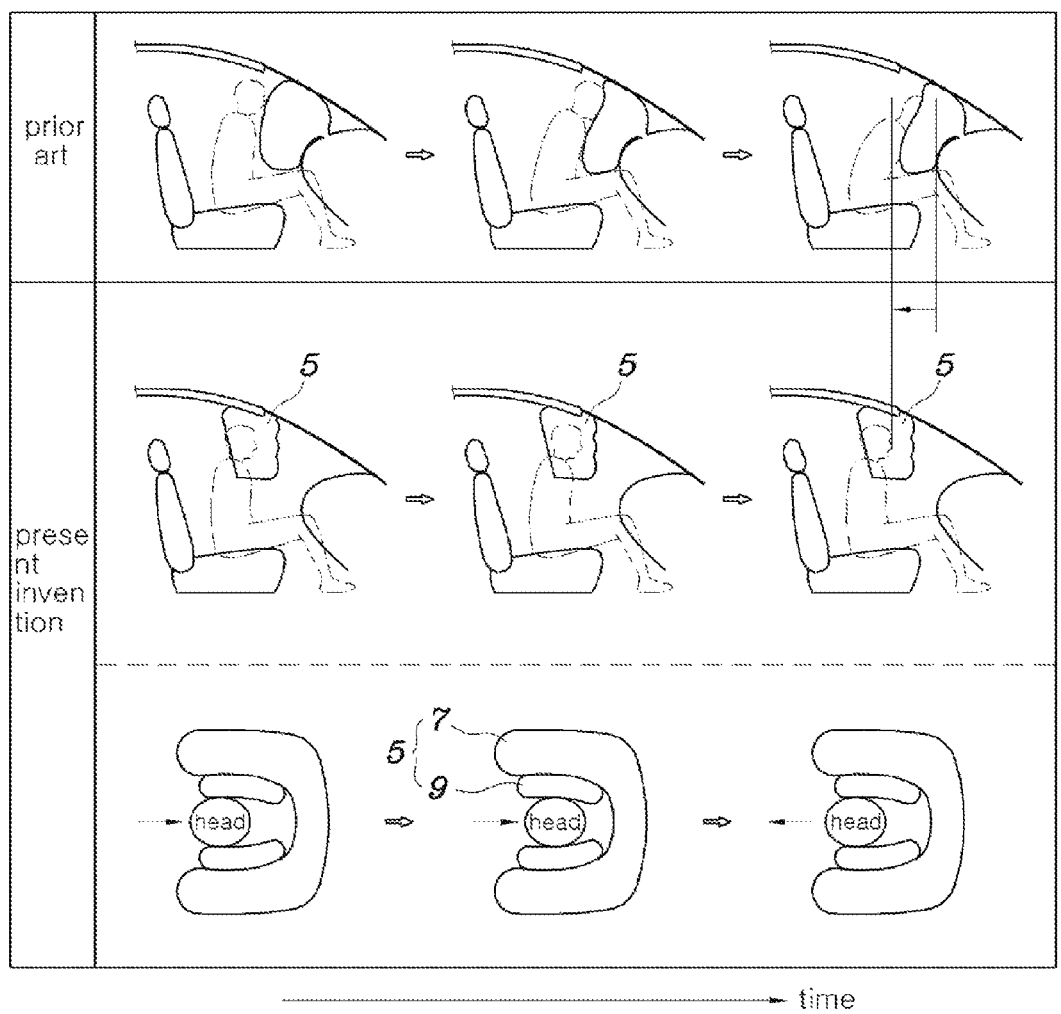
FIG. 23 is a diagram showing a comparison between an action of the present invention and the related art.

FIG. 23 is a diagram showing a comparison between an action of the present invention and the related art on the basis of the embodiment shown in FIG. 3. FIG. 23 shows an operational change from a left side as time elapsed and shows a horizontal cross-sectional view of a behavior of the head of the passenger with respect to the outer cushion 7 and the inner cushion 9 in a bottom part thereof.

In FIG. 23, as compared with the case where a front movement distance of the passenger is relatively large and the head or neck of the passenger cannot be selectively supported and protected while the head or neck of the passenger is separated from the upper body in the related art, the outer cushion 7 supports the shoulder part of the upper body rapidly and relatively strongly to reduce the front movement distance of the passenger, the head moves between the left inner middle part 9-M-L and the right inner middle part 9-M-R of the inner cushion 9, which perform relatively smoothly and gently an impact absorbing operation and the head or neck behavior naturally and stably to prevent an injury by the bending of the head or neck of the passenger.

Various embodiments of the present invention may include a housing 3 mounted on a roof 1 of the vehicle, an outer cushion 7 that is incorporated in the housing 3 and inflated toward the front of a shoulder of a passenger downward, an inner cushion 9 that is incorporated in the housing 3, inflated toward the front of a head of the passenger downward, and positioned inside the outer cushion 7, and an inflator 11 configured to supply inflation gas to be supplied to the outer cushion 7 and the inner cushion 9, as shown in FIGS. 8 to 12.

While the outer cushion 7 is inflated, the outer cushion 7 includes a left wing part 7-L and a right wing part 7-R that are divided into both sides of the head of the passenger to form a wall surface, the outer cushion 7 is connected to receive the inflation gas from the inflator 11, and includes a supplying vent hole 13 transferring the inflation gas to the inner cushion 9.

The inner cushion 9 is provided in an inner space between the left wing part 7-L and the right wing part 7-R and includes a receiving vent hole 15 for receiving the inflation gas form the outer cushion 9 and a discharging vent hole 17 for discharging the inflation gas to the outside.

The outer cushion 7 is formed so that the left wing part 7-L and the right wing part 7-R support the shoulder part of the passenger to move forward. The inner cushion 9 includes an inner top part 9-T connecting top parts of the left wing part 7-L and the right wing part 7-R horizontally, an inner bottom part 9-B connecting bottom parts of the left wing part 7-L and the right wing part 7-R horizontally, an inner front part 9-F connecting the inner top part 9-T and the inner bottom part 9-B vertically at the front side, and an inner middle part 9-M protruding toward the inner top part 9-T from the inner bottom part 9-B at the rear side of the inner front part 9-F, such that the inner middle part 9-M supports the head part of the passenger to move forward.

The inner middle part 9-M of the inner cushion 9 is divided into a left inner middle part 9-M-L adjacent to the left wing part 7-L of the outer cushion 7 and a right inner middle part 9-M-R adjacent to the right wing part 7-R.

The supply vent hole 13 is formed on inner upper surfaces of the left wing part 7-L and the right wing part 7-R of the outer cushion 7, the receiving vent hole 15 are formed at positions corresponding to the supply vent holes 13 of both sides of the inner top part 9-T of the inner cushion 9, and the discharging vent hole 17 is formed on a lower surface of the inner bottom part 9-B.

The inflator 11 is connected to supply inflation gas supplied form one inflator 11 to each of the top parts of the left wing part 7-L and the right wing part 7-R of the outer cushion 7.

Figure 8:
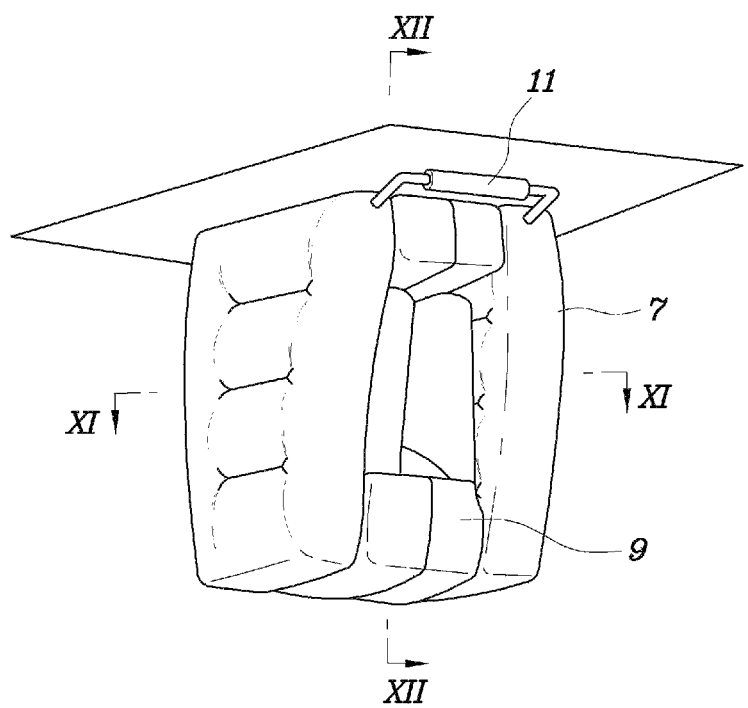
FIG. 8 is a diagram showing an exemplary roof airbag apparatus according to the present invention.
Figure 9:
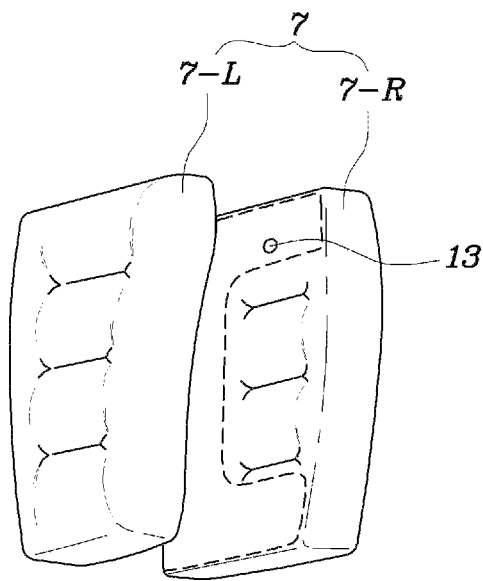
FIG. 9 is a diagram showing an outer cushion of FIG. 8.
Figure 10:
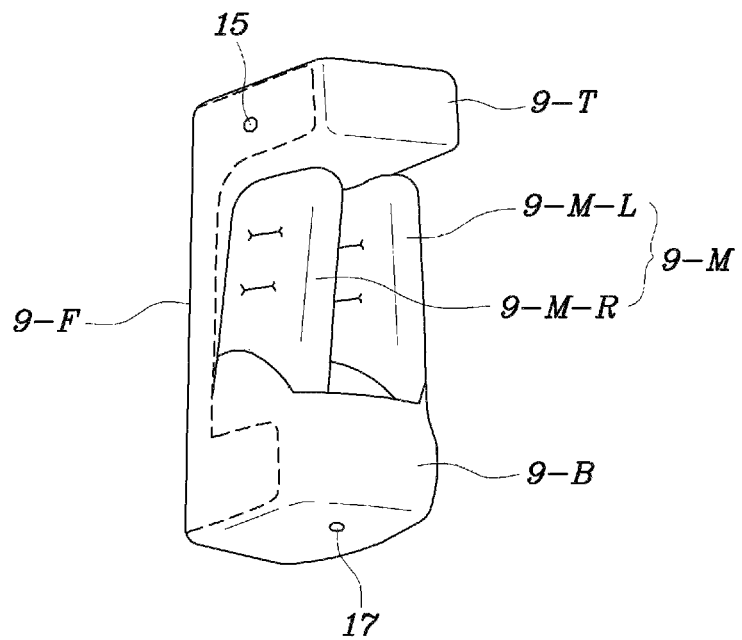
FIG. 10 is a diagram showing an inner cushion of FIG. 8.
Figure 11:
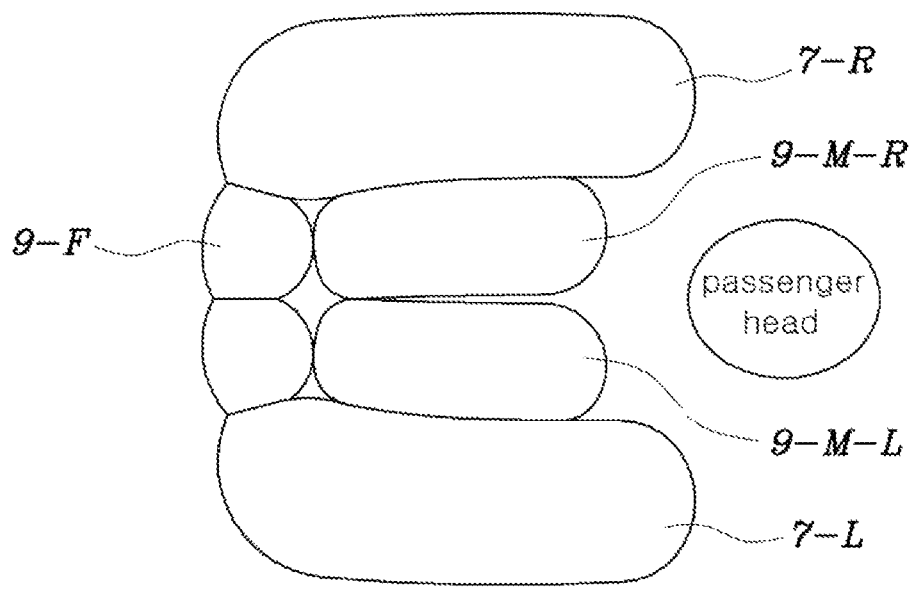
FIG. 11 is a cross-sectional view taken along line XI-XI of FIG. 8.
Figure 12:
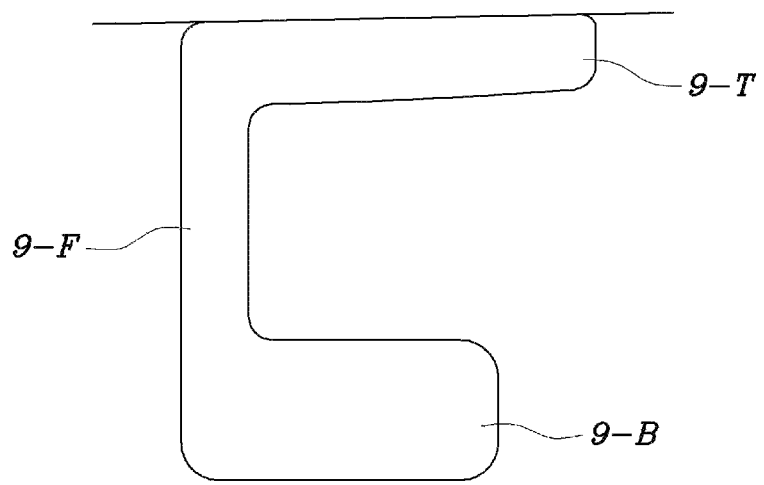
FIG. 12 is a cross-sectional view taken along line XII-XII of FIG. 8.

That is, as compared with the apparatus shown in FIG. 3, in the apparatus shown in FIG. 8, the outer cushion 7 does not have the U-shaped cross section but includes only the left wing part 7-L and the right wing part 7-R of both sides except for the outer front part 7-F in the first exemplary embodiment and the supply vent hole 13 and the receiving vent hole 15 are positioned at relatively upper sides.

Various embodiments of the present invention include a housing 3 mounted on a roof 1 of the vehicle, an outer cushion 7 that is incorporated in the housing 3 and inflated toward the front of a shoulder of a passenger downward, an inner cushion 9 that is incorporated in the housing 3, inflated toward the front of a head of the passenger downward, and positioned inside the outer cushion 7, and an inflator 11 configured to supply inflation gas to be supplied to the outer cushion 7 and the inner cushion 9, as shown in FIGS. 13 to 17.

While the outer cushion 7 is inflated, the outer cushion 7 includes a left wing part 7-L and a right wing part 7-R that are divided into both sides of the head of the passenger to form a wall surface and the outer cushion 7 is connected to receive the inflation gas from the inflator 11.

The inner cushion 9 is provided in an inner space between the left wing part 7-L and the right wing part 7-R and the inner cushion 9 is connected to receive the inflation gas from the inflator 11 and includes a discharging vent hole 17 for discharging the inflation gas to the outside.

The outer cushion 7 is formed so that the left wing part 7-L and the right wing part 7-R support the shoulder part of the passenger to move forward. The inner cushion 9 includes an inner top part 9-T connecting upper parts of the left wing part 7-L and the right wing part 7-R horizontally, an inner bottom part 9-B connecting lower parts of the left wing part 7-L and the right wing part 7-R horizontally, an inner front part 9-F connecting the inner top part 9-T and the inner bottom part 9-B vertically at the front side, and an inner middle part 9-M protruding toward the inner top part 9-T from the inner bottom part 9-B at the rear side of the inner front part 9-F, such that the inner middle part 9-M supports the head part of the passenger to move forward.

The inner middle part 9-M of the inner cushion 9 is formed as a single protrusion shape that fills a space between the left wing part 7-L and the right wing part 7-R of the outer cushion 7.

The inflator 11 is constituted by a first inflator 11-1 and a second inflator 11-2. The first inflator 11-1 is connected to supply the inflation gas to each of top parts of the left wing part 7-L and the right wing part 7-R of the outer cushion 7 and the second inflator 11-2 is connected to supply the inflation gas to the inner top part 9-T of the inner cushion 9. The discharging vent hole 17 is formed on the bottom surface of the inner bottom part 9-B.

Figure 13:
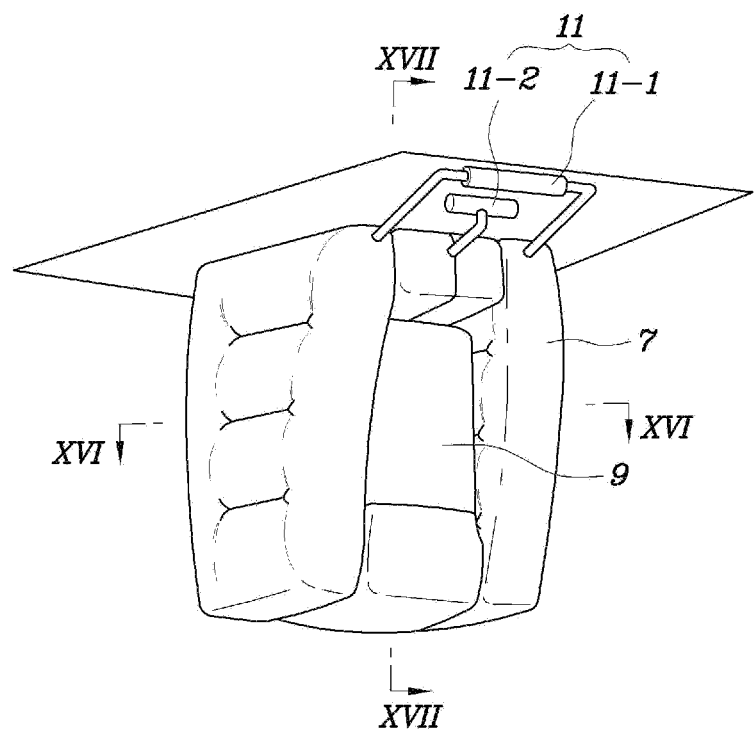
FIG. 13 is a diagram showing an exemplary roof airbag apparatus according to the present invention.
Figure 14:
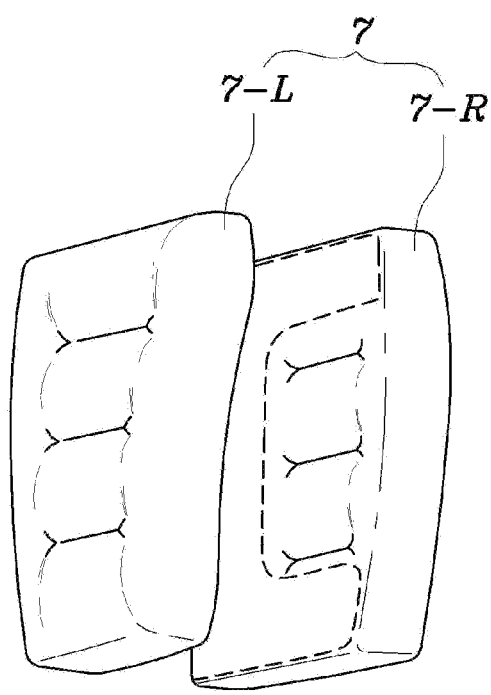
FIG. 14 is a diagram showing an outer cushion of FIG. 13.
Figure 15:
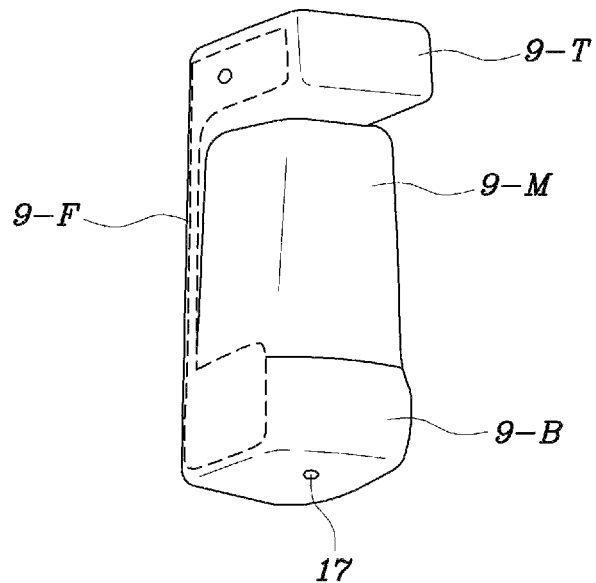
FIG. 15 is a diagram showing an inner cushion of FIG. 13.
Figure 16:
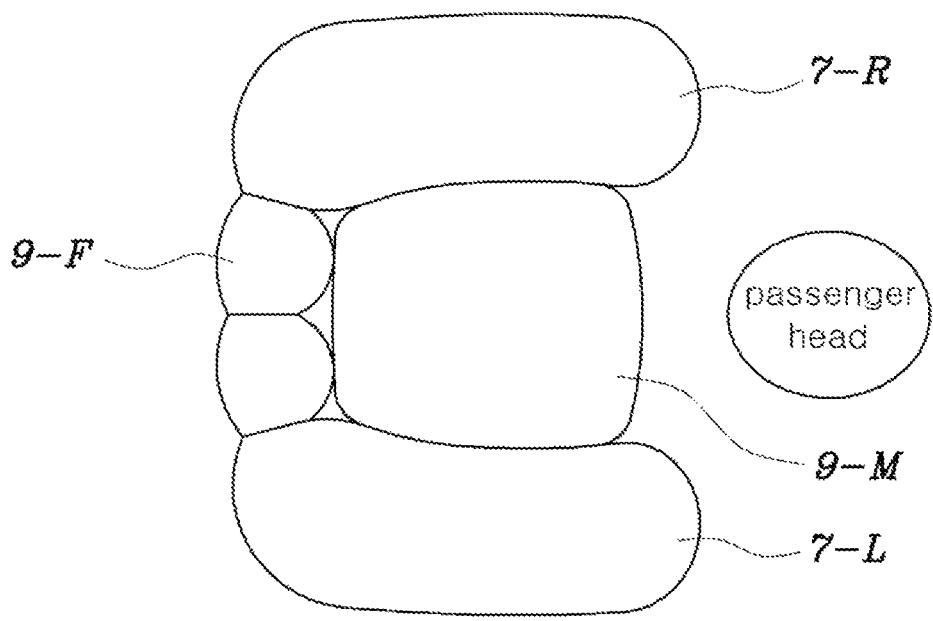
FIG. 16 is a cross-sectional view taken along line XVI-XVI of FIG. 13.
Figure 17:
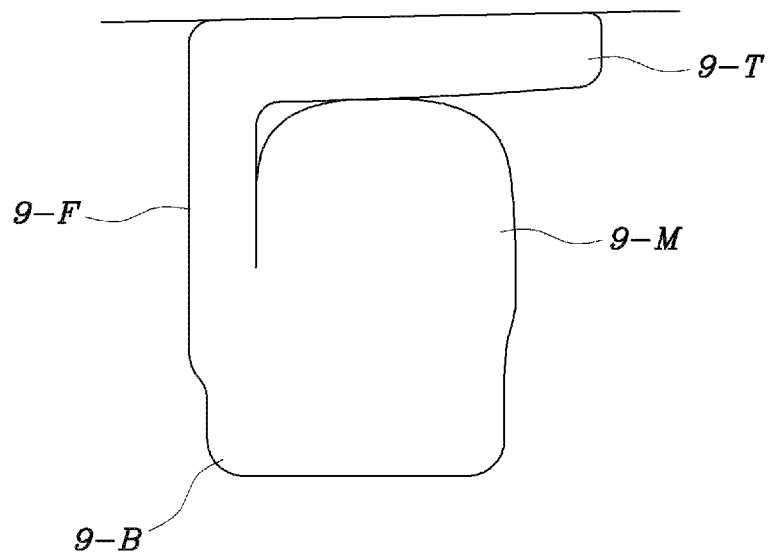
FIG. 17 is a cross-sectional view taken along line XVII-XVII of FIG. 13.
Figure 18:
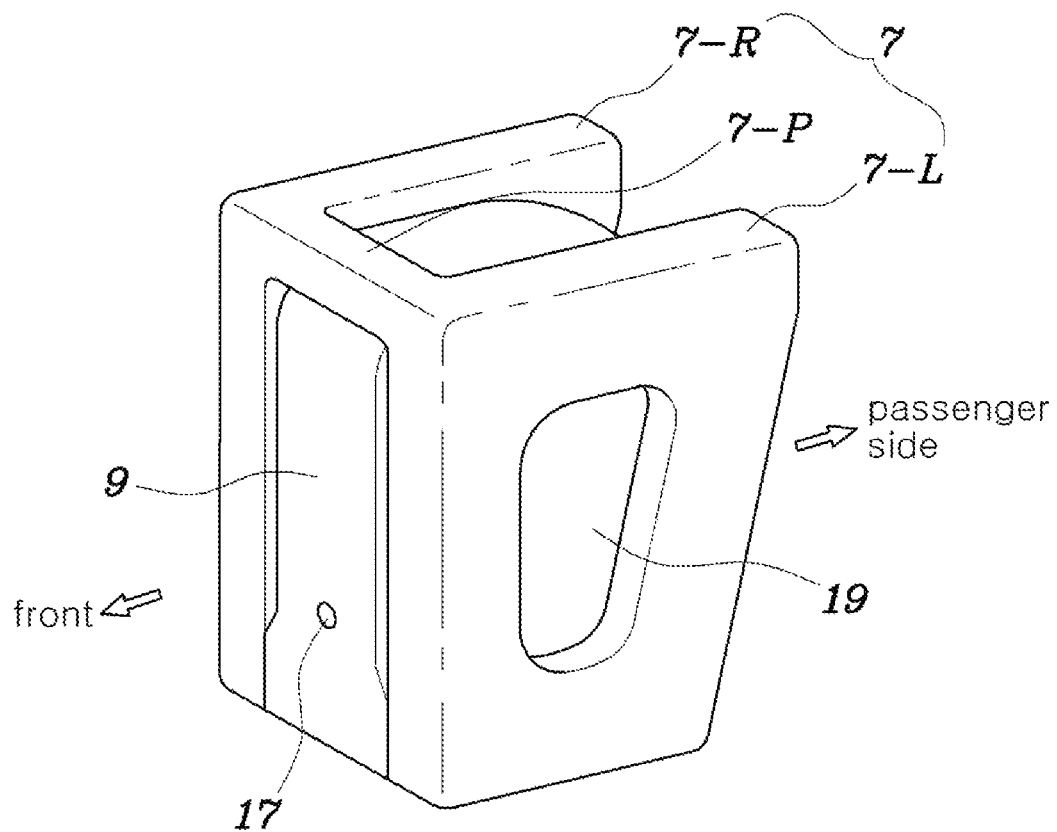
FIG. 18 is a diagram showing an exemplary roof airbag apparatus according to the present invention.
Figure 19:
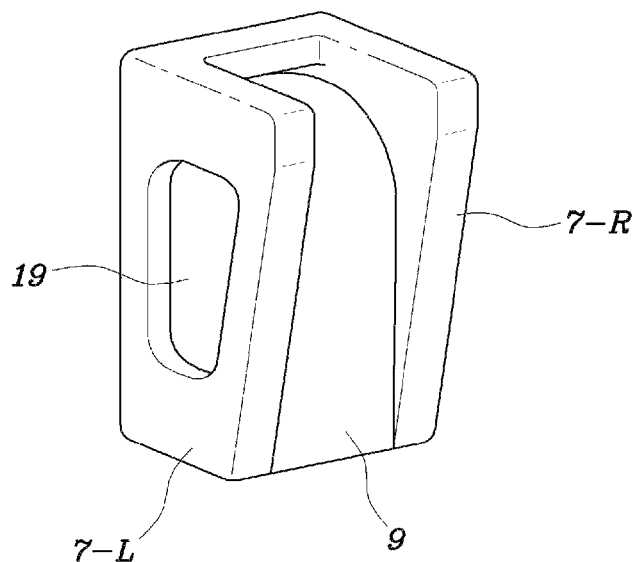
FIG. 19 is a perspective view showing a state of the apparatus of FIG. 18 viewed from a passenger side.
Figure 20:
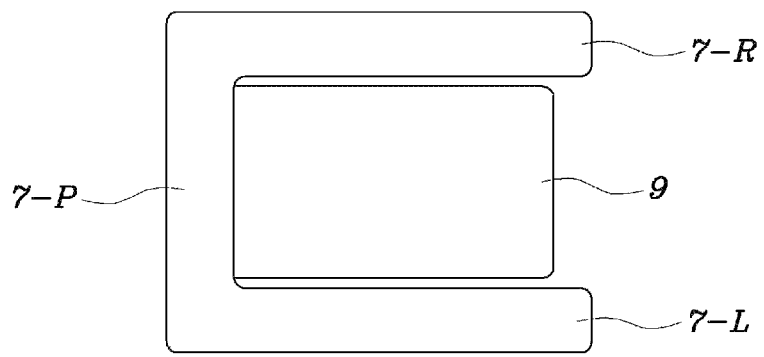
FIG. 20 is a top view of the apparatus of FIG. 18.
Figure 21:
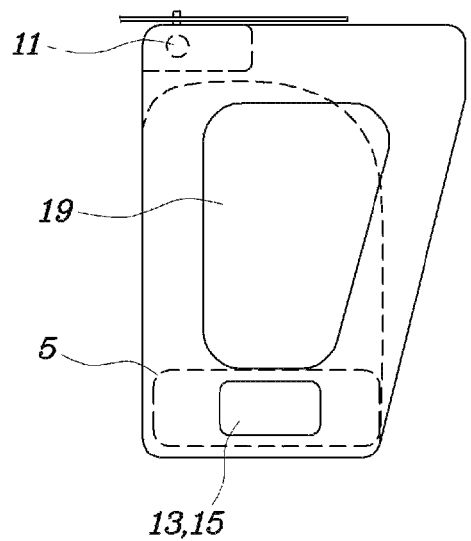
FIG. 21 is a right side view of FIG. 18.
Figure 22:
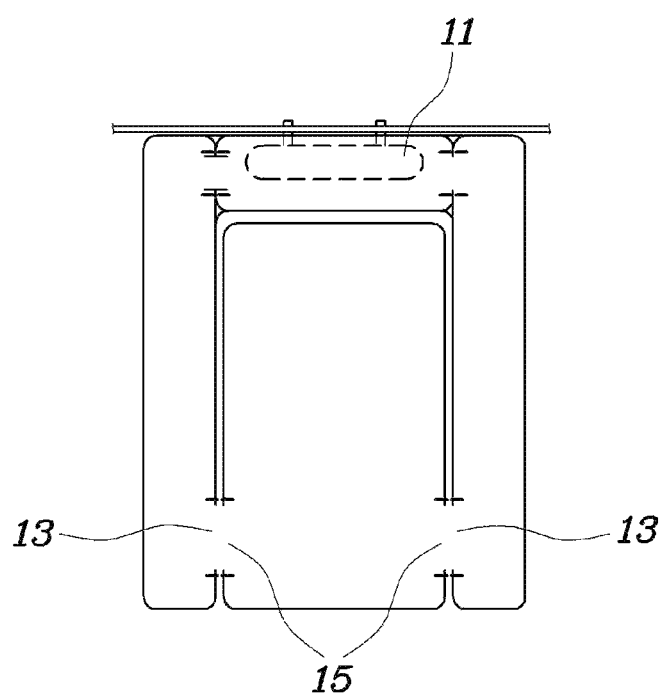
FIG. 22 is a view viewed from the passenger side of FIG. 18.

That is, as compared with apparatus shown in FIG. 8, in the apparatus shown in FIG. 13, the inner middle part 9-M of the inner cushion 9 is formed in a single protrusion shape, and the inflator 11 are constituted by two inflators to supply inflation gas to the inner cushion 9 and the outer cushion 7, respectively.

Various embodiments of the present invention include a housing 3 mounted on a roof of the vehicle, an outer cushion 7 that is incorporated in the housing 3 and inflated toward the front of a shoulder of a passenger downward, an inner cushion 9 that is incorporated in the housing 3, inflated toward the front of a head of the passenger downward, and positioned inside the outer cushion 7, and an inflator 11 configured to supply inflation gas to be supplied to the outer cushion 7 and the inner cushion 9, as shown in FIGS. 18 to 22.

While the outer cushion 7 is inflated, the outer cushion 7 includes a left wing part 7-L and a right wing part 7-R that are divided into both sides of the head of the passenger to form a wall surface, and a passage part 7-P connecting the left wing part 7-L and the right wing part 7-R with each other and includes a supplying vent hole 13 transferring the inflation gas from the inflator 11 to the inner cushion 9.

The inner cushion 9 is provided in an inner space between the left wing part 7-L and the right wing part 7-R and includes a receiving vent hole 15 for receiving the inflation gas form the outer cushion 7 and a discharging vent hole 17 for discharging the inflation gas to the outside.

In the outer cushion 7, the left wing part 7-L and the right wing part 7-R are formed to support the shoulder part of the passenger to move forward and the inner cushion 9 is formed in a single protrusion shape which protrudes to the top from the bottom to fill a space between the left wing part 7-L and the right wing part 7-R of the outer cushion 7.

The passage part 7-P of the outer cushion 7 is formed to front top parts of the left wing part 7-L and the right wing part 7-R with each other and the inflator 11 is incorporated in the passage part 7-P.

That is, the inflator 11 is incorporated in the passage part 7-P, such that the inflation gas generated from the inflator 11 fills an inner part of the outer cushion 7 directly and thereafter, fills the inner cushion 9 by passing through the supply vent hole 13 and the receiving vent hole 15.

The supply vent hole 13 is formed on inner lower surfaces of the left wing part 7-L and the right wing part 7-R of the outer cushion 7, the receiving vent hole 15 is formed at both lower sides of the inner cushion 9 to correspond to the supply vent hole, and the discharging vent hole 17 is formed on a front side surface of the inner cushion 9.

The bottom part of the inner cushion 9 is fixed to the left wing part 7-L and the right wing part 7-R and the top part of the inner cushion 9 is separated from the left wing part 7-L and the right wing part 7-R.

Accordingly, when the head part of the passenger collides with the inner cushion 9, the top part of the inner cushion 9 is bent slightly forward apart from the outer cushion 7 to buffer the head of the passenger and furthermore, secure natural behaviors of the head and neck of the passenger.

A dead zone 19 without a closed space is provided at the center of each of the left wing part 7-L and the right wing part 7-R to reduce a space for the outer cushion 7 to be inflated by the inflation gas, and as a result, the capacity of the inflator 11 can be relatively reduced.

Since the actions of the presently described embodiments are substantially similar with that of the first described embodiment shown in FIG. 23, the corresponding actions will not be described in detail.

According to various embodiments of the present invention, a relatively small capacity of airbag apparatus can be used by relatively shortening the distance between locations on which a passenger and the airbag apparatus are mounted to more effectively prevent a head and a neck of the passenger from being damaged through a discriminated supporting action of an upper body and a head part of the passenger while reducing a weight and a price of the airbag apparatus and the airbag apparatus can be easily standardized by configuration the airbag apparatus regardless of the shapes of a crash pad and a wind shield glass.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roof airbag apparatus of a vehicle comprising:
a housing mounted on a roof of the vehicle;
an outer cushion incorporated in the housing and inflated toward the front of a passenger shoulder position and downward;
an inner cushion incorporated in the housing, inflated toward the front of a passenger head position and downward, and positioned inside the outer cushion and
an inflator configured to supply inflation gas to be supplied to the outer cushion and the inner cushion;

wherein while the outer cushion is inflated, a U-shaped cross section of the outer cushion opened toward a rear passenger from the front is extended vertically, the outer cushion is connected to receive inflation gas from the inflator, and the outer cushion includes a supply vent hole transferring the inflation gas to the inner cushion, and the inner cushion which is coupled to an inner portion of the outer cushion which is opened in a U shape includes a receiving vent hole for receiving the inflation gas from the outer cushion and a discharging vent hole for discharging the inflation gas to the outside; and wherein the outer cushion includes a left wing portion forming an opened left piece of the U-shaped cross section, a right wing portion forming a right piece, and an outer front portion connecting front sides of the left wing portion and the right wing portion with each other, such that the left wing portion and the right wing portion support a passenger shoulder to move forward, and the inner cushion includes an inner top portion connecting top portions of the left wing portion and the right wing portion horizontally, an inner bottom portion connecting bottom portions of the left wing portion and the right wing portion horizontally, an inner front portion connecting the inner top portion and the inner bottom portion vertically while being adjacent to the outer front portion, and an inner middle portion protruding toward the inner top portion from the inner bottom portion at the rear side of the inner front portion, such that the inner middle portion is configured to support a passenger head to move forward.

2. The roof airbag apparatus of a vehicle of claim 1, wherein the inner middle portion of the inner cushion is divided into a left inner middle portion adjacent to the left wing portion of the outer cushion and a right inner middle portion adjacent to the right wing portion.

3. The roof airbag apparatus of a vehicle of claim 1, wherein the inner front portion of the inner cushion has a structure of forming an S-shaped curved portion which is depressed to be concave toward the front together with the inner top portion and the inner bottom portion.

4. The roof airbag apparatus of a vehicle of claim 1, wherein:
the supply vent hole is formed on inner lower surfaces of the left wing portion and the right wing portion of the outer cushion,
the receiving vent holes are formed at positions corresponding to the supply vent hole of both sides of the inner bottom portion of the inner cushion, and
the discharging vent hole is formed on a lower surface of the inner bottom portion.

5. The roof airbag apparatus of a vehicle of claim 1, wherein the inflator is connected to supply inflation gas supplied form one inflator to each of the top portions of the left wing portion and the right wing portion of the outer cushion.

* * * * *